US012633795B2

(12) United States Patent
Ruppert

(10) Patent No.: US 12,633,795 B2
(45) Date of Patent: May 19, 2026

(54) HIGH-VOLTAGE BUS BAR

(71) Applicant: Schaeffler Technologies AG & Co. KG, Herzogenaurach (DE)

(72) Inventor: Andreas Ruppert, Buhlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 216 days.

(21) Appl. No.: 18/273,667

(22) PCT Filed: Jan. 11, 2022

(86) PCT No.: PCT/DE2022/100006
§ 371 (c)(1),
(2) Date: Jul. 21, 2023

(87) PCT Pub. No.: WO2022/156852
PCT Pub. Date: Jul. 28, 2022

(65) Prior Publication Data
US 2024/0305157 A1 Sep. 12, 2024

(30) Foreign Application Priority Data

Jan. 25, 2021 (DE) .......................... 102021101504.9

(51) Int. Cl.
*H02K 3/52* (2006.01)
(52) U.S. Cl.
CPC ......... *H02K 3/522* (2013.01); *H02K 2203/09* (2013.01)
(58) Field of Classification Search
CPC .......... H02K 3/50; H02K 3/505; H02K 15/32; H02K 15/33; H02K 2203/06; H02K 2203/09

USPC .......................................................... 310/71
See application file for complete search history.

(56) References Cited

U.S. PATENT DOCUMENTS

| | | | | |
|---|---|---|---|---|
| 8,922,079 B2 * | 12/2014 | Egami | ...................... | H02K 3/28 |
| | | | | 310/71 |
| 9,800,112 B2 * | 10/2017 | Egami | .................... | H02K 3/522 |
| 11,563,350 B2 * | 1/2023 | Takahashi | .............. | H02K 21/14 |
| 2014/0175921 A1 * | 6/2014 | Tomita | ..................... | H02K 3/50 |
| | | | | 310/71 |

(Continued)

FOREIGN PATENT DOCUMENTS

| | | |
|---|---|---|
| CN | 110474462 A | 11/2019 |
| DE | 102011018637 A1 | 3/2012 |
| DE | 102011107022 A1 | 4/2012 |

(Continued)

OTHER PUBLICATIONS

EP-3567703-A1 machine translation (Year: 2019).*

(Continued)

*Primary Examiner* — Oluseye Iwarere
*Assistant Examiner* — Minki Chang
(74) *Attorney, Agent, or Firm* — Volpe Koenig

(57) ABSTRACT

A high-voltage bus bar for electrically contacting an electrical, optionally insulated, line with two mutually adjacent, distal end portions of a ring conductor. The high-voltage bus bar includes, in the region of its first distal end, a terminal for connection to the electrical line, and its second distal end bifurcates into at least two prongs in such way that each of the at least two fork prongs forms a separate contact face which is provided to be integrally bonded to one of the distal end portions of the ring conductor.

14 Claims, 5 Drawing Sheets

(56)                    References Cited

U.S. PATENT DOCUMENTS

| | | |
|---|---|---|
| 2019/0207461 A1 | 7/2019 | Ito et al. |
| 2020/0287447 A1 | 9/2020 | Ciftcioglu et al. |

FOREIGN PATENT DOCUMENTS

| | | | | |
|---|---|---|---|---|
| DE | 102012202131 | A1 | 8/2013 | |
| DE | 102018118280 | A1 | 1/2020 | |
| DE | 102019004589 | A1 | 1/2020 | |
| DE | 102020100177 | A1 | 7/2020 | |
| DE | 102019202911 | A1 | 9/2020 | |
| EP | 3567703 | A1 * | 11/2019 | .......... H02K 15/105 |
| JP | 2014-165999 | A | 9/2014 | |
| WO | 2020/195125 | A1 | 10/2020 | |

OTHER PUBLICATIONS

International Search Report and Written Opinion for International Application No. PCT/DE2022/100006 dated Apr. 13, 2022 (12 pages long).

* cited by examiner

HIGH-VOLTAGE BUS BAR

CROSS-REFERENCE TO RELATED APPLICATIONS

This application is the U.S. National Phase of PCT Appln. No. PCT/DE2022/100006, filed Jan. 11, 2022, which claims the benefit of German Patent Appln. No. 102021101504.9, filed Jan. 25, 2021, the entire disclosures of which are incorporated by reference herein.

TECHNICAL FIELD

The present disclosure relates to a high-voltage bus bar for electrically contacting an electrical, optionally insulated, line with two mutually adjacent, distal end portions of a ring conductor, in particular a ring conductor of an interconnection ring. In a further aspect, the present disclosure further relates to an interconnection ring for interconnecting winding wires of a stator of an electrical machine and to an electrical machine comprising the interconnection ring according to the disclosure, which is axially fitted thereto.

BACKGROUND

Permanently excited synchronous machines (PSM) are already used in many industrial applications and, in the course of the planned full-scale electrification, increasingly also in the automotive industry. Such a permanently excited synchronous machine usually has a stator to be energized and a permanently excited rotor. The stator comprises, among other things, a wire winding, a stator carrier, an interconnection ring, and a terminal for the power electronics.

Electrical machines with a concentrated winding can have a different number of so-called stator teeth. Usually, three of these consecutive stator teeth form a pole pair. In electrical machines with concentrated windings and a star connection, the individual pole pairs must be electrically connected to one another, wherein the accessibility of this star point is often limited by the installation space.

Components of this type are already known from the prior art. For example, DE 10 2011 018637 A1 discloses an interconnection ring for a segmented stator of an electrical machine, which comprises one contacting element each for each electrical phase to be contacted with the electrical machine.

Furthermore, a contacting device for contacting insulated electrical lines or cables, in particular at least one coil winding, is known from DE 10 2011 107022 A1.

According to the prior art, different possibilities exist regarding the implementation of the interconnection. An interconnection ring usually consists of a plastic element and has several ring conductors (usually for phase U, for phase V and for phase W), the ends of which are connected to a bus bar. A high degree of positioning accuracy, precise individual part tolerances, and multiple welding and bonding points are required in this regard. Depending on the welding method used, the weld joint may require an additional material, such as a solder flux.

The welding process requires melting of the materials to be joined, if necessary with the use of an additional solder flux, in order to obtain an integral bond. For this purpose, a significant temperature must be introduced to melt the corresponding materials or substances.

SUMMARY

The object of the present disclosure is therefore to provide a high-voltage bus bar for electrically contacting an electrical, optionally insulated, line with two mutually adjacent, distal end portions of a ring conductor, which is improved compared to the prior art, and in particular to provide a high-voltage bus bar in which the heat input introduced as a result of a welding process is optimally distributed.

In a further aspect, it is an object of the present disclosure to provide an interconnection ring for interconnecting winding wires of a stator of an electrical machine which is improved compared to the prior art, and to provide a correspondingly improved electrical machine.

According to the disclosure, the object is achieved according to a first aspect by a high-voltage bus bar having the features of patent claim 1, in a second aspect by an interconnection ring having the features of patent claim 5, and by an electrical machine having the features of patent claim 10.

The high-voltage bus bar according to the disclosure is provided for electrically contacting an electrical, optionally insulated, line with two mutually adjacent, distal end portions of a ring conductor, and comprises, in the region of its first distal end, a terminal for connecting it to the electrical line. At its opposite second end, the high-voltage bus bar bifurcates into at least two prongs in such a way that each of the at least two fork prongs forms a separate contact face which is provided to be integrally bonded to one of the distal end portions of the ring conductor.

The interconnection ring is provided for interconnecting winding wires of a stator of an electrical machine and, according to the disclosure, comprises an annular plastic body with at least three ring conductors, wherein each of the at least three ring conductors is arranged in an annularly formed groove, and wherein each of the at least three ring conductors comprises two mutually adjacent, distal end portions in each case, which are each integrally bonded to the high-voltage bus bar according to the disclosure.

The electrical machine according to the disclosure is characterized in that it has the interconnection ring according to the disclosure, which is axially fitted.

The fact that each of the at least two fork prongs of the high-voltage bus bar forms a separate contact face which is provided for integral bonding to one of the distal end portions of a ring conductor in each case means that the heat input which is introduced locally as a result of the welding process can be better distributed so that the edge zone reaches an optimum temperature for the welding process.

Compared to solutions of the prior art, in which the contact face of the high-voltage bus bar does not bifurcate for the two distal ends of the ring conductors but forms a continuous surface, the thermal energy introduced is less dispersed. The smaller surface area also reduces heat dissipation, so that less energy is required overall to carry out the welding process and, furthermore, process times can be noticeably shortened. This has a particularly beneficial effect on process costs.

Further advantageous embodiments of the disclosure are specified in the dependent claims. The features listed individually in the dependent claims can be combined with one another in a technologically meaningful manner and can define further embodiments of the disclosure. In addition, the features indicated in the claims are specified and explained in more detail in the description, wherein further preferred embodiments of the disclosure are shown.

If a laser welding process is provided as the preferred welding method for connecting the ring conductors to the bus bar, the materials, which are typically formed from copper or a copper-containing alloy, are directly integrally bonded to one another, i.e. without additional means, by melting them. Alternatively, a solder flux can also be used. In this regard, the two materials are not melted directly, but the solder flux is melted between the two surfaces of the ring conductor and bus bar and/or on these two surfaces and then bonds them together. The contact faces of the respective fork prongs of the high-voltage bus bar can therefore be formed by an end face and/or a portion of a lateral face of the respective fork prong.

To connect the high-voltage bus bar to power electronics, the terminal arranged in the region of the first distal end advantageously comprises a threaded bushing.

Within the interconnection ring, the two distal end portions of each ring conductor extend parallel to one another and perpendicular to the positional arrangement of a respective residual portion of the ring conductor arranged in the annular groove. This allows the high-voltage bus bar to be applied to the distal end portions of the respective ring conductors via the contact faces of the two fork prongs and then welded to them. The contacting of the high-voltage bus bar with the ring conductor can be implemented via a portion of a lateral face of the respective fork prong oriented towards the respective distal end portion of the ring conductor, which then bears against it and is preferably integrally bonded thereto, particularly preferably welded thereto. The integral bonding can be performed directly or by means of a solder flux, as explained previously.

In addition and/or alternatively, the two separate contact faces of the high-voltage bus bar can be formed by an end face each of the respective fork prong, which are each integrally bonded via a weld seam to a ring conductor end face each of the respective distal end portion of the ring conductor.

BRIEF DESCRIPTION OF THE DRAWINGS

Aspects of the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size ratios shown are only schematic in nature. Identical reference symbols indicate the same objects, so that where applicable, explanations from other figures can also be used. In the figures.

DETAILED DESCRIPTION

Figure 1:
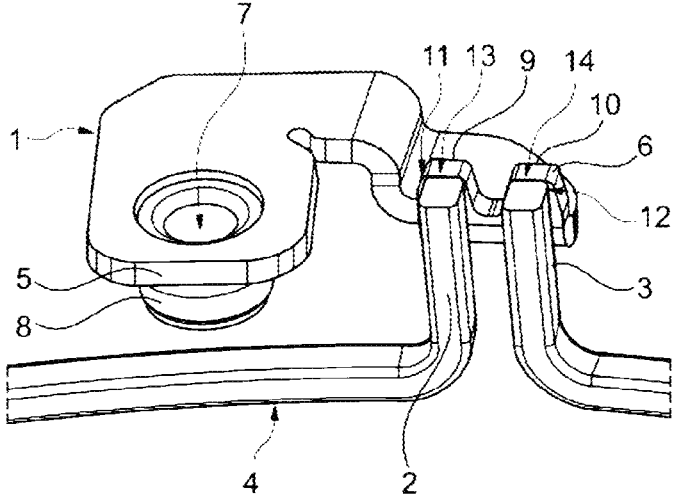
FIG. 1 shows an embodiment of a high-voltage bus bar, which is directly integrally bonded to the distal ends of a ring conductor.

FIG. 1 shows an embodiment of a high-voltage bus bar 1, which is integrally bonded to distal ends 2, 3 of a ring conductor 4. In each case, the high-voltage bus bar 1 forms an interface between the respective ring conductor 4 and power electronics (not shown).

Figure 5:
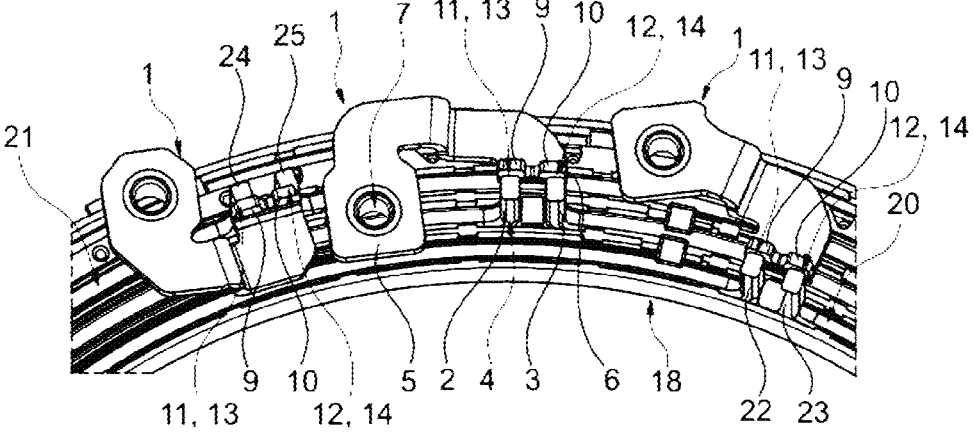
FIG. 5 shows a part of the interconnection ring shown in FIG. 4 with the high-voltage bus bars.

The high-voltage bus bar 1 has a first distal end 5 and a second distal end 6. Both ends 5, 6 can be oriented differently from one another, as can be seen in FIG. 5. Accordingly, the high-voltage bus bar 1 can have different geometric shapes.

In the region of its first distal end 5, the high-voltage bus bar 1 has a terminal 7 for connecting it to an electrical line, which in turn can be connected to the power electronics of the electrical machine. For this purpose, the terminal 7 in the embodiment shown here comprises a threaded bushing 8.

At its second end 6, the high-voltage bus bar 1 bifurcates into two prongs in such a way that each of the two fork prongs 9, 10 forms a separate contact face 11, 12 which is provided to be integrally bonded to one of the distal end portions 2, 3 of the ring conductor 4. In other words, the second end 6 of the high-voltage bus bar 1 is designed to be U-shaped so that the respective contact faces 11, 12 are aligned with the two mutually adjacent, distal end portions 2, 3 of the ring conductor 4.

In the embodiment shown here, both components 1, 4 are made of copper, wherein the illustration is intended to show a direct integral bonding between them. To produce this bond, the two components 1, 4 are contacted with one another in such a way that their contact faces, which are symbolized in FIG. 1 by the arrows 13, 14 and which are oriented towards one another in each case as well as extend axially, contact one another. The two components 1, 4 can then be conductively joined to one another by means of an integral bond, for example using a laser welding process.

Figure 2:
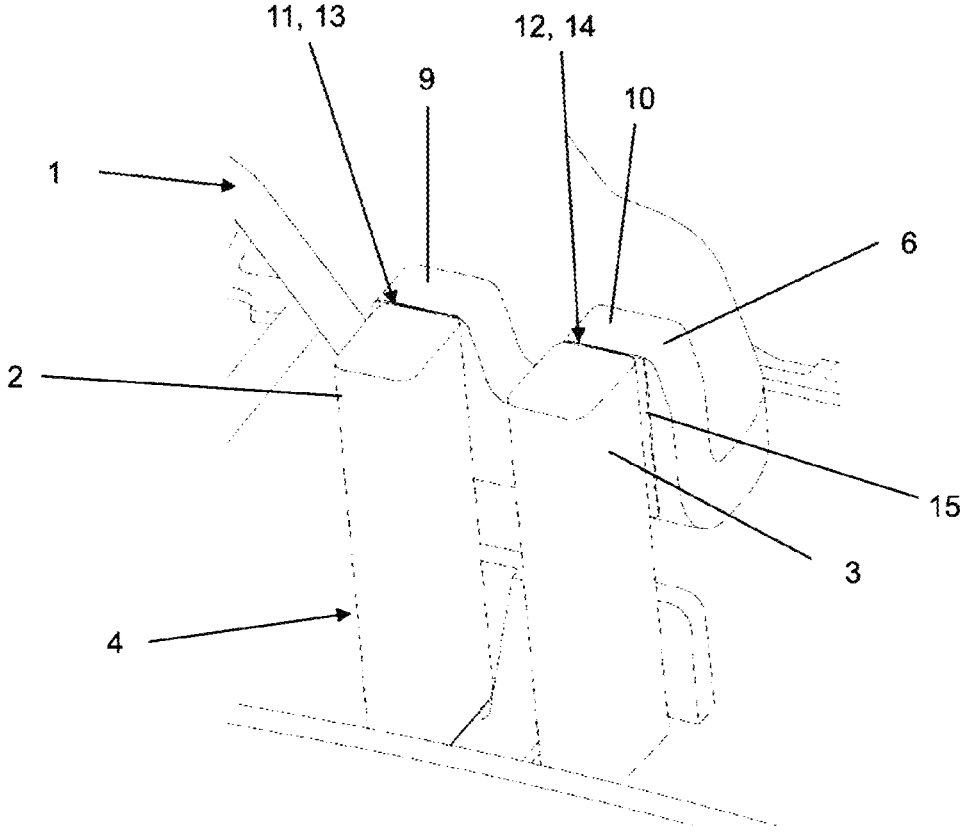
FIG. 2 shows the high-voltage bus bar shown in FIG. 1, which is integrally bonded to the distal ends of a ring conductor by means of a solder flux.
Figure 3:
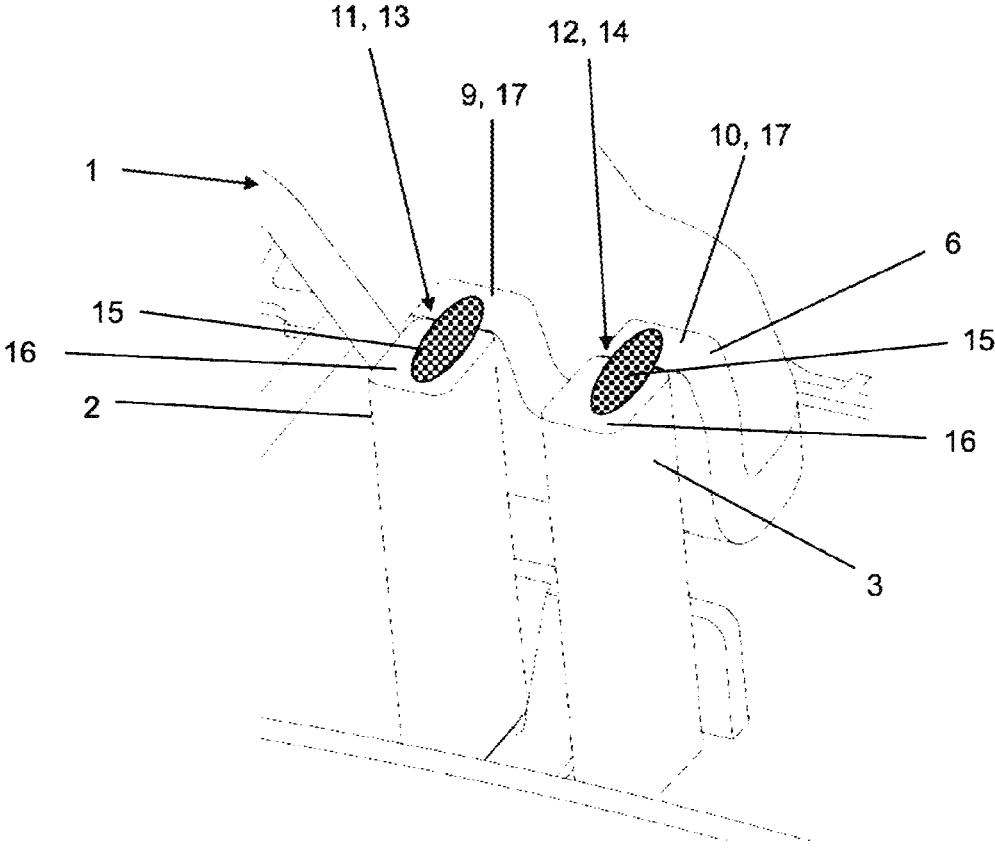
FIG. 3 shows the high-voltage bus bar shown in FIG. 1, which is integrally bonded to the distal ends of a ring conductor by means of a solder flux, wherein the connection is provided in the form of a weld seam.

Alternatively, a solder flux 15 can be used, as shown in FIGS. 2 and 3. Here, it is not the two materials of the two components 1, 4 which are melted directly (FIG. 1), but the solder flux 15, which is arranged in each case between the two contact faces 13, 14, which are oriented towards one another and extend axially (FIG. 2). The so-called brazing process achieves an integral bonding between the respective distal ends 2, 3 of the ring conductor 4 and the respective fork prongs 9, 10 of the high-voltage bus bar 1.

FIG. 3 shows a further embodiment of an integral bonding between the respective distal ends 2, 3 of the ring conductor 4 and the respective fork prongs 9, 10 of the high-voltage bus bar 1. As can be seen from the illustration, the solder flux 15 in each case covers a part of each end face 16, 17 of the ring conductor ends 2, 3 or the fork prongs 9, 10 of the high-voltage bus bar 1, respectively.

Figure 4:
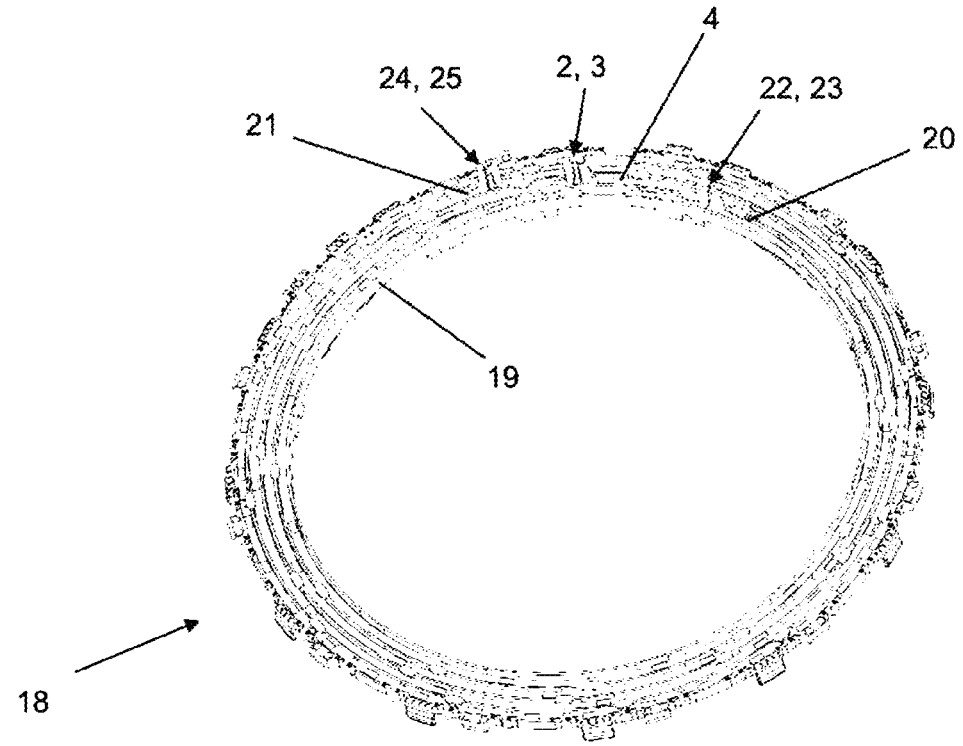
FIG. 4 shows an embodiment of an interconnection ring.

FIG. 4 shows an embodiment of an interconnection ring 18. The interconnection ring 18 is provided for interconnecting winding wires of a stator of an electrical machine (not shown) and comprises an annular plastic body 19 with three ring conductors 4, 20, 21. Each of the three ring conductors 4, 20, 21 is arranged in an annularly formed groove and has two mutually adjacent, distal end portions 2, 3, 22, 23, 24, 25 in each case.

FIG. 5 shows a part of the interconnection ring 18 with the high-voltage bus bars 1 shown in FIG. 4. As can be seen from the enlarged illustration, the two distal end portions 2, 3, 22, 23, 24, 25 of each ring conductor 4, 20, 21 in each case extend parallel to one another and perpendicular to the positional arrangement of the respective residual portion of the ring conductor 4, 20, 21 arranged in the annular groove. This allows the high-voltage bus bar 1 to be integrally bonded to the distal end portions 2, 3, 22, 23, 24, 25 of the ring conductor 4, 20, 21 via the two fork prongs 9, 10, as already explained with reference to FIGS. 1 to 3.

LIST OF REFERENCE SIGNS

1 High-voltage bus bar
2 (First) distal end/phase V
3 (Second) distal end/phase V
4 Ring conductor/Phase V
5 First distal end of bus bar
6 Second distal end of bus bar
7 Terminal
8 Threaded bushing
9 First fork prong
10 Second fork prong
11 First contact face
12 Second contact face
13 Arrow
14 Arrow
15 Solder flux/weld seam
16 End face of ring conductor
17 End face of high-voltage bus bar
18 Interconnection ring
19 Plastic body
20 Ring conductor/phase U
21 Ring conductor/phase W
22 (First) distal end/phase U
23 (Second) distal end/phase U
24 (First) distal end/phase W
25 (Second) distal end/phase W

The invention claimed is:

1. A high-voltage bus bar for electrically contacting an electrical line with two mutually adjacent, axially extending distal end portions of a ring conductor, the high-voltage bus bar comprising:

a first distal end having a terminal for connection to the electrical line, and a second distal end having a bifurcation including at least two prongs, each of the at least two prongs having a separate planar contact face configured to be welded to one of the axially extending distal end portions of the ring conductor;

wherein the separate planar contact faces are configured to abut the distal end portions of the ring conductor and define axial facing weld interfaces.

2. The high-voltage bus bar according to claim 1, wherein each separate contact face is formed by at least one of an end face or a portion of a lateral face of a respective prong.

3. The high-voltage bus bar according to claim 1, wherein the high-voltage busbar is made of copper or an alloy thereof.

4. The high-voltage bus bar according to claim 1, wherein the terminal includes a threaded bushing.

5. An interconnection ring for interconnecting winding wires of a stator of an electrical machine, comprising:

an annular plastic body with at least three ring conductors, wherein each of the at least three ring conductors is arranged in an annularly formed groove, and wherein each of the at least three ring conductors includes two mutually adjacent, distal end portions integrally bonded to a respective high-voltage bus bar, each high- voltage bus bar including a terminal for connection to an electrical line, and a second distal end having a bifurcation including at least two prongs, each of the at least two prongs having a separate contact face welded to one of the distal end portions of a respective ring conductor;

wherein the separate planar contact faces are configured to abut the distal end portions of a respective ring conductor and define axial facing weld interfaces.

6. The interconnection ring according to claim 5, wherein the two distal end portions of each ring conductor extend parallel to one another and perpendicular to a positional arrangement of a respective residual portion of the ring conductor arranged in the annular groove.

7. The interconnection ring according to claim 5, wherein each of the at least two fork prongs of each high-voltage bus bar bears against the ring conductor via a portion of its lateral face oriented towards the respective distal end portion of the ring conductor, and is integrally bonded thereto.

8. The interconnection ring according to claim 5, wherein the two separate contact faces of each high-voltage bus bar are formed by an end face each of the respective prongs of the high-voltage bus bar which are each integrally bonded via a weld seam to a ring conductor end face of the respective distal end portion of the respective ring conductor.

9. The interconnection ring according to claim 5, wherein each of the at least three ring conductors forms a phase of a pole pair.

10. An electrical machine comprising:

a stator; and an axially fitted interconnection ring for interconnecting winding wires of the stator;

wherein the interconnection ring includes an annular plastic body with at least three ring conductors, wherein each of the at least three ring conductors is arranged in an annularly formed groove, and wherein each of the at least three ring conductors includes two mutually adjacent, distal end portions integrally bonded to a respective high-voltage bus bar, each high-voltage bus bar including a first distal end having a terminal for connection to an electrical line, and a second distal end having a bifurcation including at least two prongs, each of the at least two prongs having a separate contact face integrally bonded to one of the distal end portions of a respective ring conductor;

wherein the separate planar contact faces are configured to abut the distal end portions of a respective ring conductor and define axial facing weld interfaces.

11. The electrical machine according to claim 10, wherein the two distal end portions of each ring conductor extend parallel to one another and perpendicular to a positional arrangement of a residual portion of a respective ring conductor arranged in the annular groove.

12. The electrical machine according to claim 10, wherein each of the at least two prongs of each high-voltage bus bar bears against the ring conductor via a portion of its lateral face oriented towards the distal end portion of a respective ring conductor, and is integrally bonded thereto.

13. The interconnection ring according to claim 10, wherein the two separate contact faces of each high-voltage bus bar are formed by an end face of each of the prongs of a respective high-voltage bus bar which are each integrally bonded via a weld seam to a respective ring conductor end face of the distal end portion of a respective ring conductor.

14. The interconnection ring according to claim 10, wherein each of the at least three ring conductors forms a phase of a pole pair.

* * * * *